(12) United States Patent
DeGhionno

(10) Patent No.: US 7,832,362 B2
(45) Date of Patent: Nov. 16, 2010

(54) LIGHTWEIGHT, HOLLOW, REUSABLE, FOOD-DISPENSING TREAT TOY AND COMBINATION OF FOOD-DISPENSING TREAT TOY WITH AN ENCLOSING CONTAINER DESIGNED FOR INTELLECTUAL STIMULATION, ENRICHMENT AND AMUSEMENT OF ANIMALS, AND REDUCTION OF BOREDOM OR SEPARATION ANXIETY THAT MAY LEAD TO DESTRUCTIVE OR UNDESIRABLE BEHAVIOR IN PUPPIES AND/OR OTHER ANIMALS

(76) Inventor: Nancy Brothers DeGhionno, 1773 Wilstone Ave., Encinitas, CA (US) 92024-1125

( * ) Notice: Subject to any disclaimer, the term of this patent is extended or adjusted under 35 U.S.C. 154(b) by 669 days.

(21) Appl. No.: 11/765,445

(22) Filed: Jun. 20, 2007

(65) Prior Publication Data

US 2008/0314331 A1 Dec. 25, 2008

(51) Int. Cl.
*A01K 29/00* (2006.01)
(52) U.S. Cl. ..................... 119/709; 119/707
(58) Field of Classification Search ............. 119/707, 119/708, 709, 710, 711, 702, 51.01; D30/160; 446/269, 475

See application file for complete search history.

(56) References Cited

U.S. PATENT DOCUMENTS

| 6,073,581 | A | * | 6/2000 | Wang | 119/51.01 |
| 6,186,096 | B1 | * | 2/2001 | Miller | 119/709 |
| 6,484,671 | B2 | * | 11/2002 | Herrenbruck | 119/707 |
| 2004/0200434 | A1 | * | 10/2004 | Shatoff et al. | 119/707 |
| 2005/0045115 | A1 | * | 3/2005 | Mann | 119/711 |
| 2005/0120973 | A1 | * | 6/2005 | St. Pierre | 119/709 |
| 2007/0044730 | A1 | * | 3/2007 | Axelrod et al. | 119/709 |

* cited by examiner

*Primary Examiner*—T. Nguyen
(74) *Attorney, Agent, or Firm*—InterContinetal IP; Eric A. Hanscom; Todd J. Langford

(57) ABSTRACT

This invention is directed toward a hollow food dispensing treat toy that can be filled and re-filled with animal food for unfrozen or frozen applications. The treat toy is designed to provide a mental and physical challenge to an animal desiring to lick out the contents of the container. The treat toys can be frozen in a conveniently-sized storage sleeve that fits in the shelf portion of an average freezer, and then removed at desired times. Whether unfrozen or frozen, the treat toys can be either given to the animal directly, or placed inside a larger hollow enclosing container with a hole such that the animal must align the holes in the containers to have easy access to the treat inside. Because of the design of the invention, an animal can remain entertained at length trying to extract all of the treats.

16 Claims, 3 Drawing Sheets

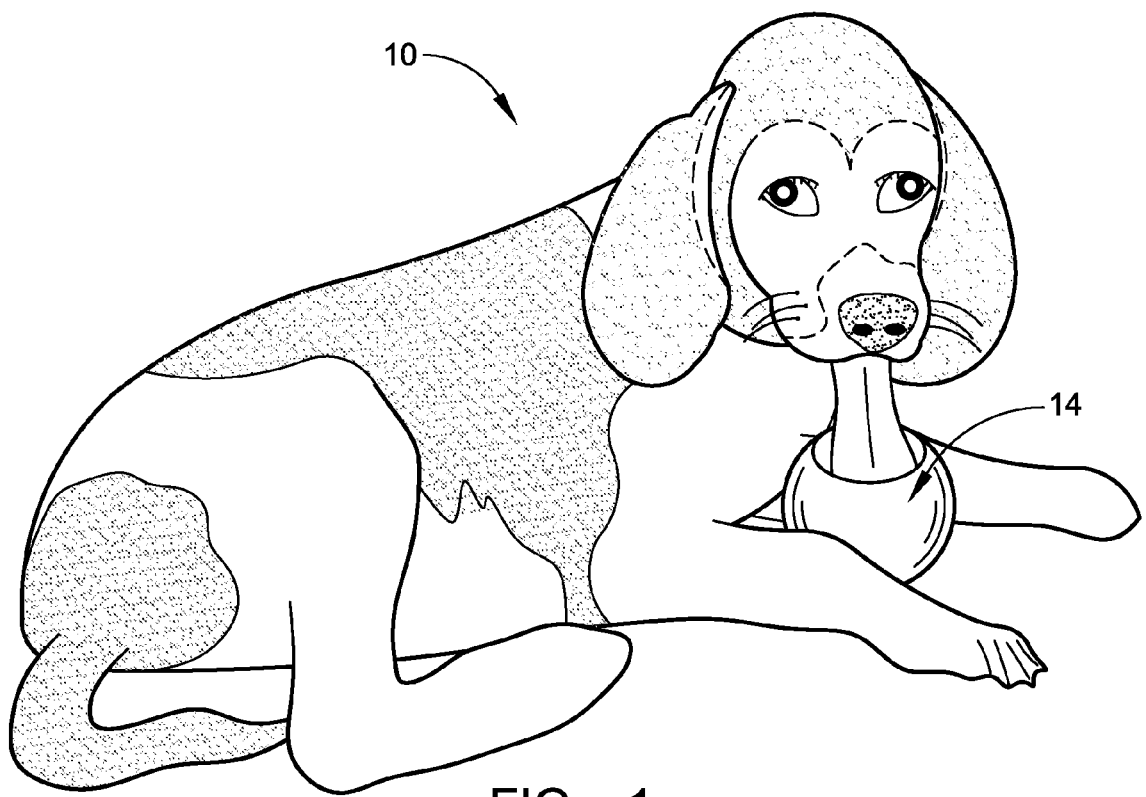
FIG. 1
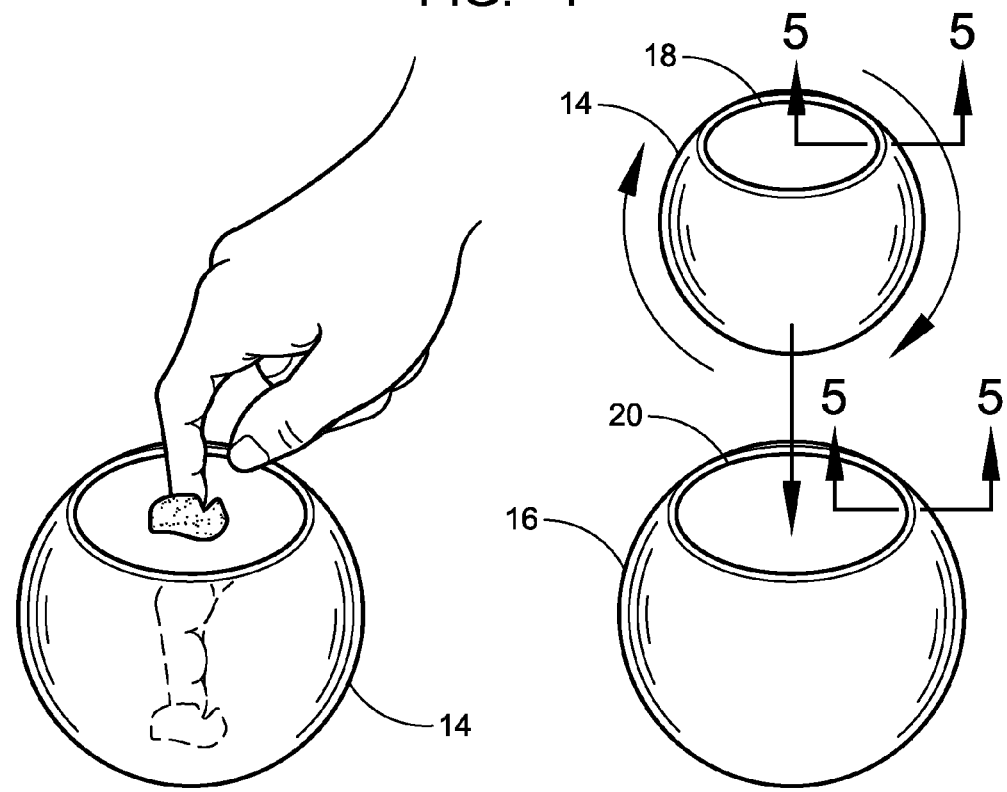
FIG. 2
FIG. 3

LIGHTWEIGHT, HOLLOW, REUSABLE, FOOD-DISPENSING TREAT TOY AND COMBINATION OF FOOD-DISPENSING TREAT TOY WITH AN ENCLOSING CONTAINER DESIGNED FOR INTELLECTUAL STIMULATION, ENRICHMENT AND AMUSEMENT OF ANIMALS, AND REDUCTION OF BOREDOM OR SEPARATION ANXIETY THAT MAY LEAD TO DESTRUCTIVE OR UNDESIRABLE BEHAVIOR IN PUPPIES AND/OR OTHER ANIMALS

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

FIELD OF THE INVENTION

This invention relates to the general field of treat-dispensing containers designed for use with animals, and more specifically, to hollow treat dispensers primarily for use with pet dogs and puppies. As a brief summary, this invention uses a hollow food-dispensing toy, called for purposes of simplicity a "treat toy," that can be filled and re-filled with animal treats or food or human food for unfrozen or frozen applications. Frozen applications are particularly preferred, as it will take the animal more time to lick out a frozen treat than a soft, room temperature treat. The treat toy is designed to provide enrichment and challenges with both mental and physical elements, to an animal desiring to lick out the contents of the treat toy, as the hole in the treat toy is a convenient size to allow a dog or other animal limited access to the contents of the treat toy.

A particularly preferred embodiment of the invention provides treat toys about the size and shape of tennis balls or racquetballs, which are hollow inside and made from a rubber, synthetic rubber, hard vinyl, plastic, nylon, synthetic polymers, synthetic fibers, polyamides or foam, or combination of the aforementioned, which may be manufactured using a variety of different colored materials or multi-colored material, which may include a scent attractive to animals, without poisonous components, which are designed to be frozen in a canister about the size of a sleeve of racquetballs, that fits in the shelf portion or on the door of an average freezer. The treat toys can then be removed at desired times from the container for use with pets or other animals.

Whether unfrozen or frozen, the treat toys can be either given to the animal directly, or placed inside a larger hollow container, called an enclosing container, with a sized hole such that the animal must align the two holes in the treat toy and the enclosing container to have easy access to the treat inside. When the treat toy is inserted inside another container, the combination is referred to as a double enclosing container. Because of the design of the treat toy and the enclosing container, and the necessity of "lining up" the two holes, an animal can remain entertained at length trying to extract all of the treats.

The invention is particularly useful for the entertainment and destruction-prevention in puppies. Puppies between the ages of two and eight months chew very frequently to relieve the soreness that teething causes their gums and this often results in undesirable destruction from their extra sharp first sets of teeth. This tendency makes puppies prime candidates for the helpful utilization of the treat toy taught by this patent. Puppies are well-known for chewing and destroying shoes and clothing, furniture, rugs and pillows, plastic flower pots and containers, household waste or even corners of drywall. Often, they may access objects they can choke on or ingest a portion of, and often, these objects are not intended to be ingested, which poses not only a damage concern regarding property but also a health risk regarding the puppy.

Unwanted digging (which may lead to a pet escaping from a yard) and barking may also be the result of puppy or dog that has not been given enough acceptable activities, amusement and/or companionship for its stage in development. Frequent interaction with a puppy throughout the day will usually interest a pup, and providing a soothing, cold, sensory experience for the pup's sore gums may calm and comfort the anxiety that accompanies the physical discomfort of teething. The frozen embodiment of the treat toy presented here requires the pup to develop and build facial, head and neck muscles throughout the licking phase and also allows for chewing, which temporarily happily occupies the pup, works its sore gums and aids in muscle development. Additionally, puppies generally experience more separation anxiety from family members as they learn to adapt and understand what to expect in terms of their owners' abilities to keep them company. Providing this type of treat toy as a tempting distraction to a pup (who has proven to be safe when left alone with the device) may reduce anxiety during the separation transition.

Pets have been kept by humans for tens of thousands of years. While it is unclear when exactly humans stopped using animals solely for food and guard animals, and began using them for pets, it is estimated that this occurred sometime between 15,000 and 12,000 B.C. Sometime during the process of using animals for pets, humans began to realize that pets were not entirely without personalities and intelligence, and began to come up with ways to entertain their pets and distract and amuse them in order to reduce their boredom, as boredom can lead to destructive, noisy or other undesirable behaviors in puppies and other animals.

As human houses became more and more fancy, with sophisticated designs and furnishings, the concern that a bored pet would exhibit its state of mind by chewing up a nearby sofa became a regrettable afterthought for many pet owners who hoped that leaving the pet with a bowl of food and water "was enough". Indeed, many pet owners have realized that the best way to keep a dog from barking is to give the dog something more entertaining to do than barking (such as trying to extract food from a food-dispensing treat toy or a double enclosing container when the treat toy inside the enclosing container is full of food).

Several decades ago, inventors began experimenting with ways to make eating something more than just walking up to a bowl of food and consuming it; hence, the food-filled play toy market was born. Coinciding with the acknowledgement that pets needed both physical and mental exercise to remain strong and vigilant was a virtual explosion in the pet industry. While 40 years ago one would have been hard-pressed to find a "pet store" larger than a thin partition in a strip mall, today's pet superstores rival the office and home improvement superstores both in size and their abilities to "anchor" a shopping center. Thus, the last several decades have seen a considerable increase in the number of food-dispensing and/or entertaining pet toys, with the goal of creating a device that stimulated both the mental and physical aspects of a pet.

The prior art has numerous examples of attempts to resolve this problem. For example, there are a number of pet toys which do not dispense food, and, therefore, tend to become ignored by the pet after an initial period of interest. There are also a plethora of food-dispensing toys which challenge, to greater or lesser degrees, the mind and body of a pet. Many of these toys involve a ball or other hollow container with one hole (sometimes having a removable or partial plug) which allows the pet owner to insert hard treats, and one or more other holes through which the hard treats occasionally fall as the pet plays with the toy. Often these devices have internal baffles or other devices designed to make it more difficult for the hard treats to fall out.

A disadvantage of such toys, however, is that a pet owner cannot easily use frozen foods as the treats. Frozen foods prepared for this device present numerous advantages over traditional pet food kibble when used as treats. First, frozen foods are generally licked by the pet until they are completely eaten, as opposed to most hard and soft treats which are gulped down immediately upon the pet obtaining access to them. A pet's digestive tract is not intended to manage large chunks of frozen food. Such pieces generally will not be swallowed by a pet retrieving intended frozen food from this device because the welcoming hole entices the pet to lick out the smooth contents, not attempt to bite the treat into pieces. By enticing the pet to lick the food from the treat toy, the pet is entertained for a substantially longer period of time than with a treat that the pet merely "wolfs" down. Using frozen soft edibles or pureed foods decreases the chance of irritation or injury to the animal's tongue that might occur if chunky or hard foods were to be frozen in the toy intended for the animal to consume by licking the entire contents out.

Second, some human meal leftovers make excellent frozen food treats for pets, thereby providing an economical way to entertain the pet along with decreasing waste and saving money. Among the possible leftover treats to freeze are mashed potatoes, baby food, refried beans, cooked cereal and other soft edibles or pureed meats, whole grains and rice, and vegetables low in sugar, spices and salt and without onion.

Third, frozen treats may aid a pet in cooling its body temperature in the hot sun or after active play, and can be refreshing and potentially nutritious treats.

Fourth, frozen treats also allow a pet owner to creatively combine various foods (or combine leftovers with non-leftover foods) so that the pet has a variety of frozen treats ready for its entertainment, physical and mental exercise, and nutrition. Some additional foods which work well as frozen pet treats which are commonly found in homes and have been proven to be desirable as pet treats include soft edibles such as smooth natural peanut butter or almond butter, yogurt, cottage cheese, plain oatmeal, mashed bananas, pumpkin and applesauce. Tuna, canned meats and poultry, whole grain rice, carrots, cooked potatoes and yams and many other vegetables can be pureed or pulped, then placed in a treat toy for freezing if desired. Additionally, whey and soy protein products provide excellent protein and can be combined with various other foods which may be considerably tempting to the pet. Flavorings such as cinnamon, brewers yeast, and small amounts of low-sodium bouillon can be added to make the treat tastier to the pet. There also exists an availability of ready-made paste-consistency dog treats in portion-dispensing cans available for purchase at many pet supply stores and websites.

Fifth, this device is suitable for a wide variety of homemade vegan dog treats and foods that can be conveniently stored inside the treat toys for easy and convenient dispensing to a pet. This device also provides a means for advance preparation, storage and then serving of special diet foods which some pet owners may need to prepare. Treat toys with a wide variety of flavor and nutritional components can be provided by the pet owner, sometimes by as simple a means as increasing the quantities of some of the foods they would prepare for themselves. This may prove to be beneficial, convenient and economical to some pet owners due to a limited selection of vegan and special diet pet foods commercially available.

Sixth, pet owners can choose treat toy contents in a way that avoids odors they find offensive and they are able to avoid products known to cause allergic reactions in either the pet or family members.

Seventh, because of the design of the device, water can be frozen into ice cubes within the treat toy and dispensed for refreshment and enjoyment without any calories. Similarly, small amounts of low-sodium bullion can be added for liquid enjoyment while at the same time requiring the pet to engage in at least some physical activity.

A challenge with using frozen treats for pets is how to store them. Thus, there exists the need for a pet toy which can dispense a frozen treat. Ideally, the frozen treat could be stored in the toy itself without leakage, and the treat toy could be designed such that a number of them could be stored in a convenient compact manner in a pet owner's freezer.

Some of the currently available food-dispensing toys allow the pet owner to insert soft edibles such as peanut butter into cavities and/or crevices in the toy, which the pet can then lick out. These toys present sanitation problems as often the cavities and crevices are shaped such that a pet cannot easily remove all the food and thus, must be cleaned between uses. Unfortunately, the same physical designs which make it difficult for a pet to remove food remnants also make it difficult for human, or a dishwasher, to clean these devices in between uses. Finally, many dogs who cannot remove all the food from a pet toy will bury the toy so that they might return to it for another try at retrieving the food later rather than leaving it lying around for the owner to clean.

Thus, there exists a need for a pet toy which stimulates the pet, allows the pet to actually remove all the food from the toy, and is easy to clean. This need is met by the current invention. The design of this invention is especially convenient with foods of paste-like consistencies. Additionally, if used unfrozen, dry food kibble can be placed inside toy to as much as two thirds full and then covered with peanut butter or another paste-like treat to temporarily "seal in" the meal contents. This allows for use dispensing dry meal kibble with an enticing paste treat.

While the aforementioned possibility of using frozen food in a treat toy allows the pet a longer period of entertainment and exercise, it does not, in and of itself, solve the problem of cleaning. As the frozen food softens, if the treat toy is designed with hard-to-reach crevices, a pet will often abandon the treat toy as the pet tires of trying to clean a remote crevice, or in some cases it is actually painful to the pet to try to access such crevices with its tongue. Again, if the pet gives up trying to remove the final remnants of the now soft food, it may bury the toy in hopes of the contents softening in the damp soil and in anticipation of a more successful attempt at retrieving the contents at a later time. If a secondary hole exists at the bottom of a toy, leakage may occur during filling, freezing, thawing and/or manipulation and consumption, which is likely to create additional messes in need of cleaning by the pet owner.

Thus there has existed a long-felt need for a hollow treat toy that dispenses food, both frozen and unfrozen, where the pet dog, cat, ferret, etc., can access the entire food-containing portion of the toy so that he/she can clean it completely. The treat toy should be designed to be challenging to the pet, so that the pet is both mentally and physically challenged over a reasonable length of time, and yet not be designed with small crevices or cavities which prove nearly impossible for the average pet to reach with its tongue such that the average pet gives up partway through playing with the treat toy, and either buries the toy or creates a sanitation problem for the owner who then must clean the very same locations which the pet could not reach. The pet owner should be able to reuse the treat toy many times, filling and re-filling the food-containing cavity with leftovers, treat food and/or nutritious food for either unfrozen or frozen applications. The type of treats and foods chosen by the pet owner can be adjusted to have these treat toys serve as delivery devices for a pet's meals, where the pet owner has the availability to use leftover human food, health foods and supplements, in addition to soft pet foods, as part or all of the contents filled into the treat toy.

For the frozen applications, the treat toys should be designed to be frozen in a conveniently-sized storage container that fits on the door or in the shelf portion of an average freezer. The treat toys could then be removed as needed, and since each frozen treat could be made from different ingredients, the pet could remain stimulated and well-nourished as each treat could be different from the last one.

There is also a need for a device which further stimulates the pet, whereby one food-containing treat toy—either unfrozen or frozen—is placed inside a larger hollow container, called an enclosing container, with a sized hole such that the animal must align the two holes in the treat toy and the enclosing container to have easy access to the treat inside. This combination, called for purposes of simplicity "double enclosing container." presents a physical and mental challenge that can entertain a pet further as the pet tries to extract all of the food.

In this respect, before explaining at least one embodiment of the invention in detail it is to be understood that the embodiments of the invention are not limited in their application to the details of construction and to the arrangement of the components set forth in the following description or illustrated in the drawings. The embodiments of the invention are capable of being practiced and carried out in various ways. In addition, it is to be understood that the phraseology and terminology employed herein are for the purpose of description and should not be regarded as limiting.

The current invention provides just such a solution by having a hollow treat toy, preferably in a rounded shape and approximate size of a tennis ball or racquetball into which food can be inserted. The food can be pet food or treats, human food, leftovers, or some combination thereof. A pet owner can vary the amount of time a pet will be entertained by the device by varying the amount of food placed in the container portion of the treat toy. The treat toy is made from non-toxic components which are not easily chewed or torn apart by the pet. The hole into which the food is inserted is designed to be large enough for easy insertion of food and to allow the pet to lick clean the entire interior of the cavity, and yet be small enough so that the pet has to use its paws and bend its neck to allow its tongue access to the entire cavity. The hole also may have a slightly thickened rim which provides not only additional strength against tearing, but also a larger, smoother surface against which the pet's tongue rubs, thereby reducing irritation to the pet.

The treat toys can be manufactured in a variety of sizes, with a variety of hole sizes as well. The diameter of the hole in a treat toy should be proportional to the tongue and muzzle size of the pet which will be using the treat toy—not too small such that the pet cannot effectively access the interior, but not too large to the point where the pet is not challenged in removing the treat. This, a further advantage of this invention is the fact that a pet owner can use different treat toys with differently sized openings as the pet develops. The pet owner can also use treat toys with differently sized openings to give the pet some variety.

While the pet toy as described above provides a food-dispensing treat toy that meets a long felt need, the invention provides additional advantages over the prior art. With a preferred embodiment of the invention having the treat toy in the approximate shape and size of a tennis ball or racquetball, approximately three of the toys can fit conveniently into a plastic storage canister the shape of a "sleeve" of tennis balls, which could be slightly shorter than a standard tennis ball canister for ease of use by the pet's owner. The plastic storage canister has a plastic cap which can seal the treat toys in the canister. Because both the canister and cap are plastic, they can survive numerous trips into and out of the freezer and dishwasher with minimal damage, and even if they eventually become inoperable, their low cost makes them easy and relatively painless to replace. Thus, a pet owner can make up a variety of "flavors" of treats for insertion into the treat toy, use a spoon to drop dollops of a flavored treat into each toy and spread it around for the challenge of retrieval, put several treat toys in each canister, place the tops on the canisters and put all the canisters on the door shelf of the freezer. Two or three hours later, the pet owner has a variety of frozen treats ready for the pet's exercise, entertainment, refreshment and nutrition.

Additional possible shapes envisioned include interior cavity shapes equivalent to sphere, multi-sphere, egg, football, ovoid and multi-ovoid shapes; unlimited exterior shapes including but not limited to those of the interior shapes plus irregular spheres in the approximate size and with the approximate texture of a scoop of ice cream, animal figures, geometric shapes, spikes, vegetable and fruit shapes, other food product shapes such as a roast chicken, beef knuckle bone, irregular shapes, novelty shapes, etc. that would additionally allow for pleasant grabbing texture and surface variety for the pet. This would allow for irregular rolling patterns while retaining excellent cavity accessibility.

The pet owner can further increase the time span over which the pet can be entertained by placing the food-filled treat toy (a frozen toy is particularly preferred but this same method can work with an unfrozen toy) into a larger ball, called an enclosing container, with a circular, oval, wavy or scalloped opening slightly smaller than the diameter of the treat toy to be inserted. Thus, the pet owner has to push the treat toy into the enclosing container, and the pet is not likely to be able to remove the treat toy from the enclosing container to get easier access to the food. The hole is large enough, however, for the pet owner to remove the treat toy from the enclosing container for cleaning and refilling. The enclosing container can also have a slightly thickened rim around the lip region to strengthen it and decrease the chances that the pet's tongue will be cut or irritated by the sides of the hole. Similarly, the enclosing container's opening may also lend itself to accommodating another treat toy or a similarly-shaped item that is not treat-filled, but can be inserted into the larger ball if sized appropriately, and temporarily "trap" the smaller item inside, away from the pet's full manipulation, until the owner pops it out by stretching the hole of the outer ball or exerting pressure from behind. This is an additional means of utilizing the enclosing container as a play object without the additional use of food.

To obtain food from the toy, the pet must now control the double enclosing container with its paws, and maneuver the treat toy around inside the enclosing container such that the pet's tongue can access the food. Studies have shown that this has proven fairly difficult for the pet, and yet not so difficult that the pet gives up. In addition, the desirability of the treat provides adequate incentive for the pet to continue trying to work with the enclosing container and the treat toy until the entire treat is licked out of the treat toy and consumed. Once the pet owner notices that the pet is no longer playing with the enclosing container, the treat toy can be removed from the enclosing container and both the treat toy and the enclosing container can be washed, either by hand, jet-sprayed with a garden hose, or placed "hole down" in a dishwasher.

Only one enclosing container is needed or used at one time, though having numerous treat toys can be convenient for delaying cleaning until the dishwasher is full and for preparing several treat fillings at the same time. The enclosing container can also serve as a solo treat-dispensing toy without the use of the smaller, more challenging, inner toy, and can be used for a larger dog in the household.

It is not recommended that the device be given to a dog small enough to insert its snout up to its eyes in the ball, or to a dog large enough to choke on the treat toy.

The surface of both the treat toy and the enclosing container can be made from a variety of pet-pleasing materials. A preferred embodiment of the invention when used as a singular treat toy provides an outer surface made of a felt-like material, similar to the surface of a tennis ball. Studies have shown that dogs in particular like the "feel" of a felt exterior, and the ease of cleaning a felt-like exterior with a quick blast from a garden hose is a further advantage of this type of exterior covering.

To accommodate a wide range of pet sizes, the treat toy and, optionally, the enclosing container can be made in a variety of sizes, with holes of various diameters. Even though the enclosing container may be too large for some dogs to put their mouth around, those dogs may be able to insert their lower jaw into the hole of the enclosing container in order to transport and manipulate it and it may in fact be the most appropriately-sized double enclosing container for that dog.

Another potential use of the toy without freezing is for dispensing hard, stick-like treats such as canine beef or chicken jerky, rawhide discs, hard dog biscuits, and the like. With these treats, a pet owner can squeeze either a treat toy or an enclosing container to change the round hole into an ellipse with a long axis and a short axis, then insert the hard treat along the long axis, discontinue squeezing the ball, and allowing the ball to recompress into its original position, thereby wedging the hard treat inside of the ball.

While the preferred embodiment of this invention involves the use of one or more hollow containers—namely a treat toy and an enclosing container—made of plastic, rubber, foam, nylon, synthetic polymers, synthetic fibers, polyamides or a durable combination thereof, the same principle of invention may be applied to devices designed to feed and entertain captive wild animals as well. Zoos find that a frequent problem encountered in caring for large carnivores, such as bears and big cats, is that these animals are used to a life of hunting, and tend to get bored when faced with a life of nothing to do other than to pace back and forth in a small cage or exhibit pen. Primates, skunks, opossums and raccoons also benefit from interaction with amusement devices such as the invention taught by this patent that reward effort with food treats. To mentally stimulate such animals, zoos regularly use devices known as "Cricket Cannons" which dispense different types of treats at irregular intervals, thereby, in theory, keeping the animal mentally alert for when the next treat will be shot into its pen.

The current invention can also provide a period of mental and physical exercise for an animal in a zoo, circus, or other place of confinement where the animal is not allowed to perform its natural hunting or food-gathering functions. The invention as used for bears or big cats would have to be modified considerably, as the same rubber or plastic that would provide a lifetime of entertainment for an average sized dog could be torn apart in less than a minute by a larger, more powerful bear, tiger or lion. Thus, the enclosing containers would have to be made considerably larger, such that the animal couldn't swallow them, and tougher—made of aluminum, stainless steel, polyurethane, resin/fiberglass or a similarly durable substance. With the embodiment of the invention providing a food dispensing hollow treat toy within a larger hollow enclosing container, if the outer enclosing container was made from a non-flexible material, it could be made in two pieces which sandwiched together to enclose the food-containing toy, with bolts or some other type of secure, locking mechanism to prevent the animal from ripping the two halves apart. The bolts and nuts could fit into recessed cavities, thereby producing a spherical or other shape without protuberances, or there could be an outwardly extending flange with holes drilled at various intervals through which the bolts are attached.

It is also contemplated that the treat toy and combination of treat toy and enclosing container could also be hung from a lanyard clip or other device manufactured as part of the treat toy or enclosing container, such that a climbing animal such as a monkey or an animal capable of reaching and licking a treat toy hanging from a branch, fencing, or object of similar height, could be entertained in locations other than the ground.

A further embodiment for monkeys and other dexterous animals such as raccoons would be a donut-shaped enclosing container or ball track, which may be mounted on a pedestal, in which one or more treat toys could be placed, where the linear opening of the enclosing container would face outward around the donut shape rather than into the hole of the donut and the animal(s) could manually move the treat toy(s) around inside of the enclosing container to manipulate the treat toy such that the enclosed treat could be more easily removed. The enclosing container could be further divided into sections, such that the movement of individual treat toys would be limited to certain segments of the enclosing container. It is also contemplated that such donut-shaped enclosing containers could also be used to study or teach cooperative behavior in primates and other intelligent animals.

While the preferred embodiment of this invention utilizes one or more re-useable toys that ideally accommodates paste-consistency pet treats that can be served unfrozen or frozen, an edible encasement of similar shape to the aforementioned re-useable toys, made of edible materials such as shaped and dried animal hide, fish skin, pig ears, a composite vegetable "cup," hollowed-out apple, tomato, bell pepper or squash, etc., may be used as the treat-filled "device," being formed in a rounded enough shape inside to allow almost full access to the smooth frozen "contents" by the pet's tongue.

It is additionally worth noting that while a preferred embodiment of this treat toy and enclosing container is manufactured with flexible materials which allow for a variety of interactivity including chewing, stretching, compressing and bouncing of the device by the pet even after the treat has been consumed by manipulating and licking the device, the scope and intent of this invention also allow for the use of more rugged and durable materials that may not enable the aforementioned characteristics of flexibility.

Further areas of applicability of the present invention will become apparent from the detailed description and drawings provided hereinafter. It should be understood that the detailed description and specific examples, while indicating various embodiments of the invention, are intended for purposes of illustration only and are not intended to limit the scope of the invention.

SUMMARY OF THE INVENTION

It is a principal object of the invention to provide a food-dispensing toy that can provide a pet with an extended physical and mental challenge.

Additional objects of this invention include:

Providing a food-dispensing toy which can accommodate both frozen and unfrozen treats.

Providing a food-dispensing toy which can be conveniently filled and refilled with pet food, human food, or leftovers from a human meal.

Providing a convenient means of freezing such toys in a standard freezer such that a large number of such toys are ready for a pet's feeding and entertainment at any one time, while at the same time offering a convenient and compact method of storing numerous food-dispensing toys within a reasonable amount of a pet owner's freezer space.

Providing a combination of a food-dispensing treat toy that can be inserted into a larger, hollow, enclosing container and removed by a human after the pet has finished extracting all the food from the food-dispensing treat toy, referred to as a double enclosing container.

Designing the food-dispensing toy and the larger, hollow container such that both have pet-safe access holes which the pet needs to at least partially line up to access the treat.

Creating the food-dispensing toy and the larger, hollow container from non-toxic materials such that the pet can safely lick the food from the food-dispensing toy.

Creating an extremely strong model of the treat toy and enclosing container suitable for use by a bear, lion, or other large, strong captive animal.

Creating a ball track style of enclosing container capable of enclosing several treat toys for the cooperative, socializing and skill development of small primates and other dexterous animals with opposable thumbs.

Designing both the food-dispensing treat toy and the larger, hollow, enclosing container such the holes in both devices challenge the pet to successfully access the food, but at the same time allow the pet to reach all the food in the treat toy with its tongue such that an average pet can remove all the food from the food-dispensing treat toy.

Designing the various devices such that they can be cleaned easily either by hand or in a dishwasher after use.

It is a final object of this invention that the invention is made from inexpensive materials such that the cost of one of these treat toys is equal to or less than the food-dispensing toys currently on the market.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

FIG. 1 is a perspective view of a pet dog licking a treat from a treat toy.

FIG. 2 is a perspective view of a pet owner spreading a treat into a treat toy.

FIG. 3 is a perspective view of a treat toy ready for insertion into an enclosing container, showing how the treat toy can be rotated by the pet once it is inserted into the enclosing container.

DETAILED DESCRIPTION OF THE FIGURES

Figure 4:
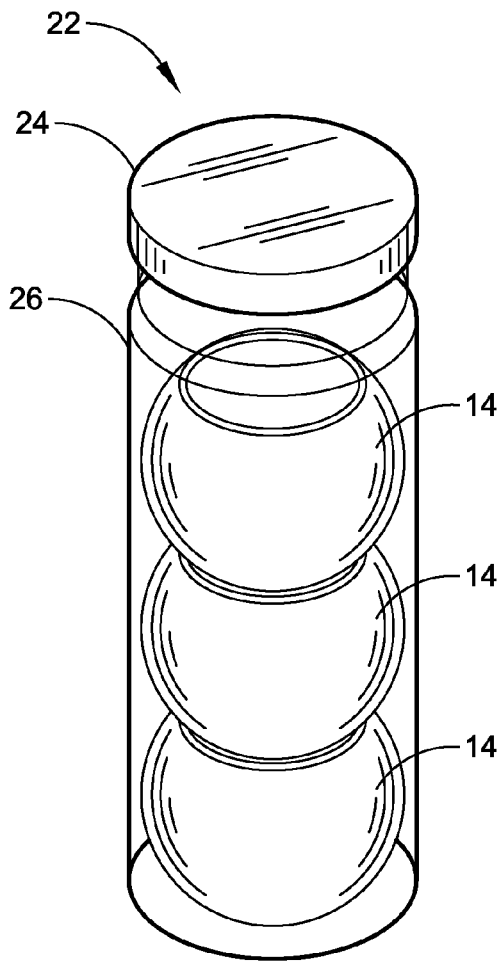
FIG. 4 is a perspective view of a storage sleeve or canister containing three treat toys.

The referenced drawings are in simplified form and are not to precise scale. Additionally, the treat toy and enclosing container are not limited to any specific uniformly or nonuniformly shaped and dimensioned openings or configuration of openings, exterior shapes, texturing or practicable size, as specific features described herein may be used in some embodiments but not others, without departure from the spirit and scope of this invention.

FIG. 1 is a perspective view of a pet dog licking a treat from a treat toy. The dog, generally referred to by reference number 10, has taken a treat toy 14 in between its paws, and is licking out the contents of the treat toy. Because the treat toy is hollow on the inside, the pet owner can fill it with a variety of spreadable treat materials, discussed more fully above, and supply the treat toy to the dog in either frozen or unfrozen condition.

FIG. 2 is a perspective view of a pet owner spreading a spreadable treat into a treat toy. The treat toy 14 in this illustration is spherical, although non-spherical shapes are contemplated as being fully functional and are considered part of this invention. The treat toy 14 has an inner cavity defined by a lip, into which spreadable treats can be physically inserted by a person. The openings may be of any practicable size to allow insertion of a pet's tongue. It is contemplated that treat toys with various sizes of holes would be manufactured such that pets with all sizes of tongues and mouth sizes could be challenged and entertained by the device, such that a pet owner could purchase one or more treat toys with a hole size appropriate for the pet in question. The lip may be of any thickness, width or height which may provide reinforcement of the opening to the cavity. The cavity can also be filled with food and frozen, for a treat which will take the pet a considerably longer time to lick out of the cavity.

FIG. 3 is a perspective view of a treat toy 14 ready for insertion into an enclosing container 16, showing how the treat toy can be rotated once it is inserted into the enclosing container. The opening of the enclosing container is defined by a lip 20, and is slightly smaller than the diameter of the treat toy. Thus, the pet owner must use at least some force to press the treat toy into the enclosing container. Once the treat toy has been inserted into the enclosing container, it is nearly impossible for a pet to remove the treat toy. Because the outside diameter of the treat toy is smaller than the inside diameter of the enclosing container, the treat toy can rotate about inside of the enclosing container. Since a pet must "line up" the hole, defined by lip 18, in the treat toy with the hole in the enclosing container, manipulating the enclosing container with its paws and the treat toy with its tongue will entertain and challenge a pet for a prolonged period of time. Additionally, a material that emits a squeaking or similar sound, or electronically generated sounds when chewed or impacted by an animal or by being thrown, may be selected for constructing portions of the enclosing container. Additionally, portions of the enclosing container may include lighting which can be triggered in one or more of any of the aforementioned manners used to activate a noisemaker.

Figure 5:
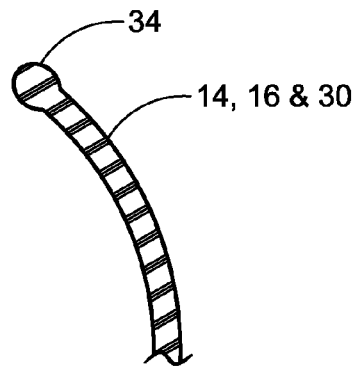
FIG. 5 is a cross sectional view of one embodiment of the lip of a treat toy or of an enclosing container.

Reference numbers 5 indicate a cross sectional view of the sides of the treat toy and enclosing container, which are shown in more detail in FIG. 5.

FIG. 4 is a perspective view of a canister 26 containing three treat toys 14. The canister 26 is a hollow container of the approximate dimensions of the racquetball sleeve that has a solid bottom, a cylindrical side portion slightly smaller than the height of an average shelf on a freezer door, and a hollow top. A lid 24 can attach to the top of the hollow container through means such as screw threads, snapping lid sides, or any other known means of attaching a lid to a hollow container. The canister assembly 22, consisting of the canister 26, the lid 24, and one or more treat toys 14, can be conveniently stored in the shelf portion of a freezer. Through this method, a number of treat toys can be prepared, frozen, and made ready for use at a desired future time by a pet owner. Because the canister assembly 22 fits conveniently into a freezer door shelf, and because each canister can store up to three treat toys, a large number of treat toys may be prepared at one time, then left in the freezer until the pet owner wishes to provide one to the pet. Advantages of storing treat toys in a canister or storage sleeve include that fact that because it is made from plastic, the storage sleeve is not easily broken, can be reused multiple times, is compact, lightweight and convenient for travel, can be easily accessed by pet owner, and is easily cleaned. The storage sleeve is also, inexpensive, has transparent sides thereby allowing one to easily view the contents. The top can be removably attached to the cylinder by any know means of attachment, including the snap-on lids of tennis ball sleeves, screw threads, and magnets.

FIG. 5 is a cross sectional view of one embodiment of the lip 34 of a treat toy or of an enclosing container (14,16, and 30). While there are several different shapes and configurations of lips contemplated by this invention, a preferred embodiment has a slightly thickened, and/or flared lip portion. Since the lip 34 of the treat toy or enclosing container will bear the brunt of the pet's chewing and gnawing, it is desirable that the lip be tough and durable relative to the sides and bottom of the treat toy or enclosing container, which get considerably less attention from the pet.

Figure 6:
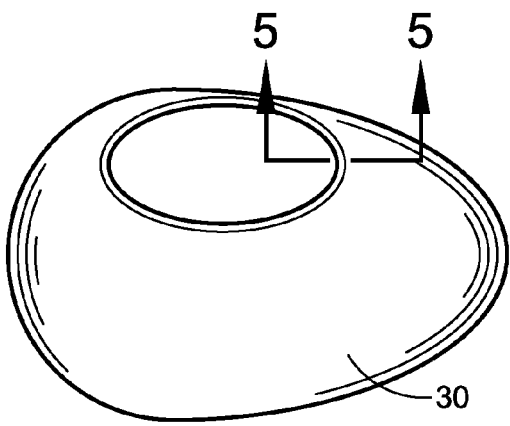
FIG. 6 is a perspective view of a treat toy in the shape of an egg, where the egg shape causes the treat toy to roll in an irregular and unpredictable manner when the treat toy is rolled by a human or pushed by a pet.

FIG. 6 is a perspective view of an egg-shaped treat toy 30, where the irregular shape of the treat toy causes it to roll in an irregular and unpredictable manner when the treat toy is rolled by a human or pushed or bounced by a pet. The interior egg shape provides for varying access difficulties to a pet trying to access the treat when compared to the relatively consistent access found with a spherical treat toy. Reference numbers 5 indicate a cross sectional view of the sides of the treat toy and enclosing container, which are shown in more detail in FIG. 5.

Figure 7:
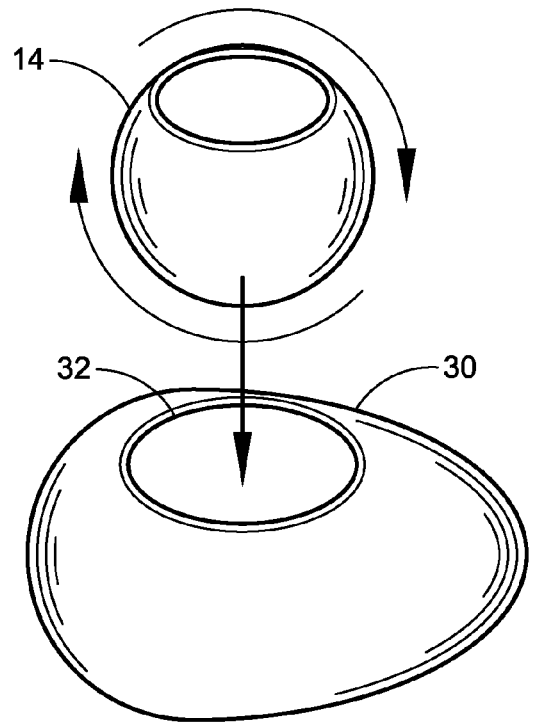
FIG. 7 is a perspective view of a round treat toy ready for insertion into an egg-shaped enclosing container, where the shape of the enclosing container will additionally allow for some lateral movement of the treat toy inside the enclosing container, which will cause the treat toy to roll in an irregular and unpredictable manner inside of the enclosing container, along with allowing the enclosing container to roll in an irregular and unpredictable manner.

FIG. 7 is a perspective view of a round treat toy 14 ready for insertion into an egg-shaped enclosing container 30, where the shape of the enclosing container will additionally allow for some lateral movement of the treat toy inside the enclosing container, which will cause the treat toy to roll in an irregular and unpredictable manner inside of the enclosing container, along with allowing the enclosing container to roll in an irregular and unpredictable manner. Because the inside of the enclosing container is not a perfect sphere, the movement of the treat toy 14 within the enclosing container 30 will also be irregular. There is a hollow cavity inside the enclosing container, defined by a lip 32. The lip 32 has a diameter slightly smaller than the diameter of the treat toy 14. Thus, the pet owner must press the treat toy 14 past the lip 32 into the enclosing container 30. Once the treat toy has been inserted into the enclosing container, it is nearly impossible for a pet to remove the treat toy. Because the outside diameter of the treat toy is smaller than the inside diameter of the enclosing container, the treat toy can rotate about inside of the enclosing container. Since a pet must "line up" the hole in the treat toy with the hole in the enclosing container, manipulating the enclosing container with its paws and the treat toy with its tongue will entertain and challenge a pet for a prolonged period of time.

While the embodiment shown here has a spherical treat toy inserted into an irregularly shaped enclosing container, numerous additional combinations of treat toys and enclosing containers are contemplated by this invention and considered part of it. For example, FIG. 3 shows a spherical treat toy inserted into a spherical enclosing container. It is also contemplated that non-spherically shaped treat toys—such as egg shapes or football shapes—could be inserted into both spherical and non-spherical enclosing containers.

It is also contemplated that the treat toy and combination of treat toys and enclosing containers could also be hung from a lanyard clip or other device manufactured as part of the treat toy or enclosing container, such that a climbing animal such as a monkey or an animal capable of reaching and licking a treat toy hanging from a branch or fencing, for example, could be entertained in locations other than the ground. A further embodiment for monkeys and other dexterous animals such as raccoons would be a donut-shaped enclosing container or ball track, which may be mounted on a pedestal, in which one or more treat toys could be placed, where the linear opening of the enclosing container would face outward rather than into the hole of the donut and the animal(s) could manually move the treat toy(s) around inside of the enclosing container to manipulate the treat toy such that the enclosed treat could be more easily removed. It is also contemplated that such donut-shaped enclosing containers could also be used to study or teach cooperative behavior in primates and other intelligent animals.

Figure 8:
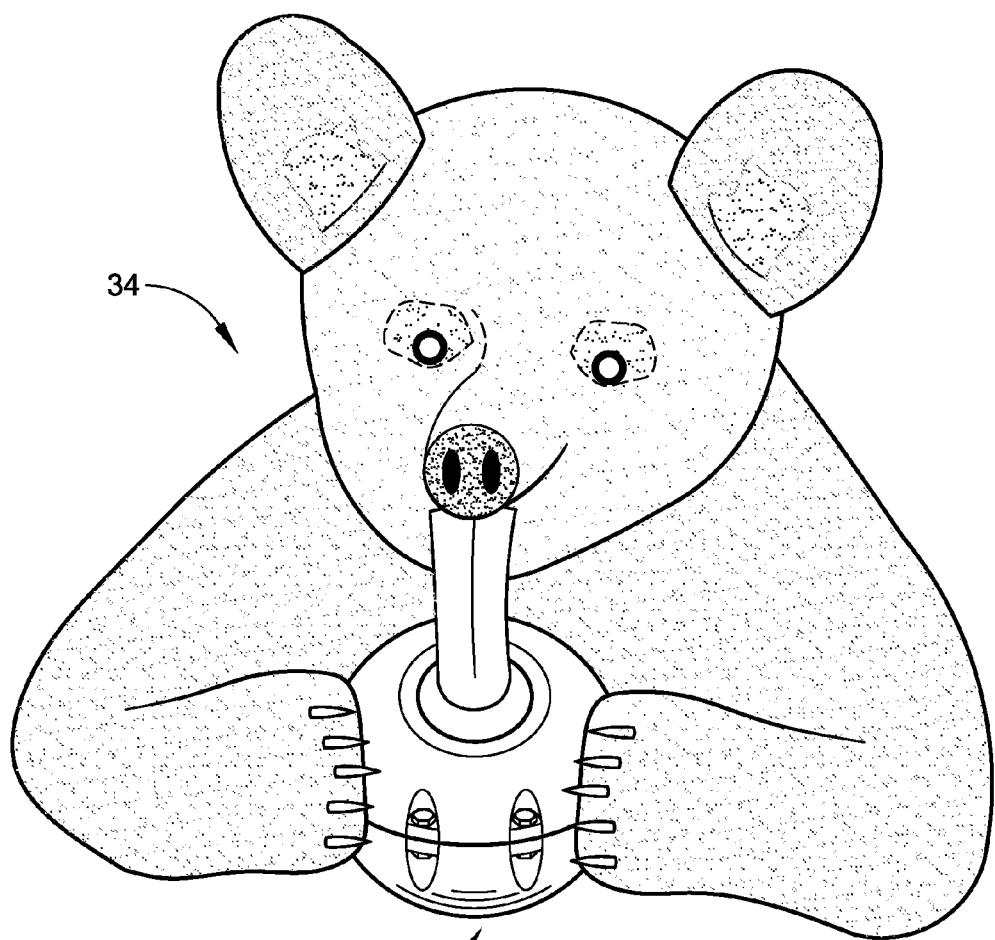
FIG. 8 is a perspective view of a bear licking the contents of another embodiment of the invention—a treat toy made from two pieces of extremely strong and rugged material removably connected to one other by bolts or some other means of attachment so that a captive wild animal more powerful than the average pet cannot rip open the treat toy, but still allow a zookeeper or other user of the invention to easily clean and refill the treat toy in between uses.

FIG. 8 is a perspective view of a bear 34 licking the contents of another embodiment of the invention—a high strength treat toy, generally referenced by reference number 38, made from two pieces of extremely strong and rugged material removably connected to one other by bolts or some other means of attachment so that a captive wild animal more powerful than the average pet cannot rip open the treat toy, but still allow a zookeeper or other user of the invention to easily clean and refill the treat toy in between uses. The high strength treat toy 38 is filled with treat food by a zookeeper or other user of the invention, and then tossed or otherwise safely inserted into the captive animal's cage for his or her entertainment. The food can be unfrozen or frozen food similar to that described for other embodiments of the invention elsewhere in this patent, or an item of the captive animal's normal food, such as a dead rabbit—frozen or unfrozen—which the animal then can try to extract from the high strength treat toy 38. Once the captive animal has consumed all of the treat food inserted into the treat toy 38, the treat toy can be removed from the animal's cage, the two halves can be taken apart through unscrewing and removal of the bolts and cleaned by any known method, then reattached to each other, the cavity in the high strength treat toy filled again with treat food either before or after reattachment, and the high strength treat toy 38 is ready to use again.

Figure 9:
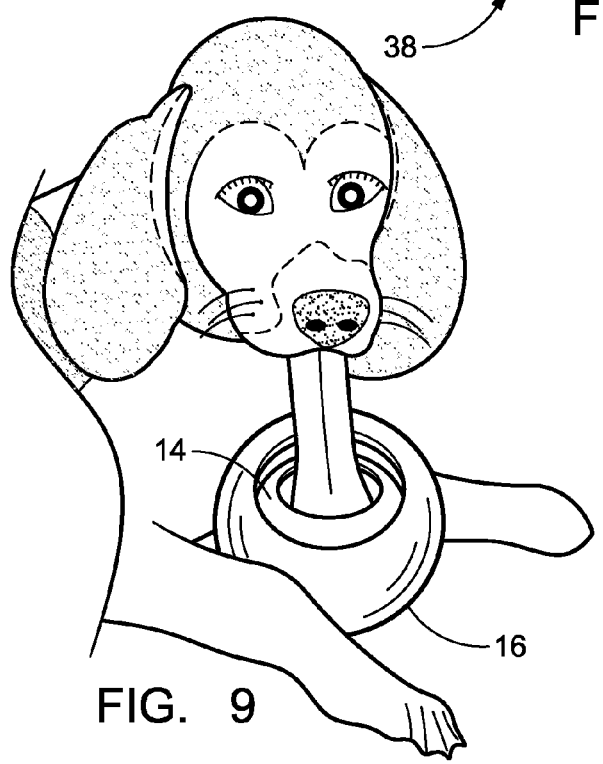
FIG. 9 is a perspective view of a pet dog using its tongue and paws to hold steady an enclosing container and lick the contents of a treat toy which has been inserted into the enclosing container.

FIG. 9 is a perspective view of a pet dog using its tongue and paws to hold steady an enclosing container 16 and lick the contents of a treat toy 14 which has been inserted into the enclosing container 16. While it is contemplated that the treat toy 14 can be used alone, without first inserting it into an enclosing container 16, a particularly preferred embodiment of the invention provides a treat-filled treat toy which is inserted into an enclosing container. The two-container assembly provides for additional stimulation, physical challenge, and mental challenge, as the pet must hold the enclosing container 16 steady in its paws, then rotate the treat toy 14 such that the opening to the treat toy 14 is lined up with the opening in the enclosing container 16. Once the pet has licked the contents of the treat toy clean, the pet owner can remove the treat toy from the enclosing container easily and quickly by inserting one or more fingers into the cavity in the treat toy and pulling upward.

Figure 10:
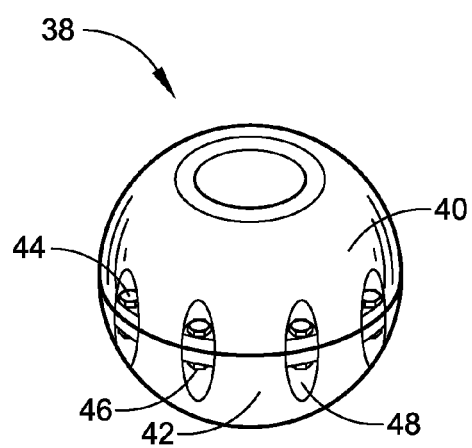
FIG. 10 is a perspective view of the embodiment of the invention illustrated by FIG. 8, showing the embedded nature of the bolts and the thickness of the walls relative to the pet version of the treat toy and enclosing container.

FIG. 10 is a perspective view of the embodiment of the invention illustrated by FIG. 8, showing the embedded nature of the bolts and the thickness of the walls relative to the pet version of the treat toy and enclosing container. The high strength treat toy 38 has an upper unit 40 and a lower unit 42. The upper unit 40 has a hole in the top which can allow a captive animal limited access to the interior cavity, in which a treat is placed. Recessed slots 48 in the portions of the upper unit and lower unit close to the juncture of the upper unit and lower unit allow for nuts 46 and bolts 44 to hold the two units together. The high strength treat toy 38 is preferably made from metal or some other high strength and durable material that can withstand a rigorous pummeling from a bear, lion, tiger, large primate, or other captive wild animal with considerable strength. However, because frozen metal may be dangerous to an animal's mouth, lips and tongue, it is necessary to insert a frozen treat into the cavity in the treat toy rather than freeze the treat toy with the treat food inside. As such, it is desirable to allow a zookeeper to take apart the treat toy, insert a frozen treat into the cavity, reattach the two halves of the treat toy and allow the animal to slowly remove the treat food one lick, bite, or nibble at a time.

It is also envisioned that an enclosing container very similar in construction to the high strength treat toy illustrated in this figure could be used as an enclosing container for a treat toy, similar to the two-container assembly similar to those illustrated by FIG's. 3 and 7. In such a scenario, where the enclosing container is made from metal, with bolts and nuts holding the two halves together, the treat toy inside of the metal enclosing container could be either a "pet version" treat toy similar to those described in FIGS. 2, 3, 4, 5, 6, 7, and 9 by reference number 14, or a metal treat toy with an opening, similar in shape and design to the treat toy referenced in previous figures, but made of metal or another sturdy material. The advantages of a "pet version" treat toy include that it would be that it would be easier to freeze a large number of treat toys at once and then insert them into the metal enclosing container at desired time, and that the animal is unlikely to injure its tongue on the frozen plastic or rubber treat toy (as compared with the injuries the animal could receive from licking a frozen metal treat toy). It is thought that having a metal enclosing container with a plastic treat toy inside would be ideal for wild animals such a raccoons or some of the smaller monkeys, which have considerable dexterity and inquisitive minds, but not as much physical strength as the larger animals found in a zoo. The advantages of a metal treat toy include the fact that the animal would be much less likely to destroy the metal treat toy if it was able to remove the metal treat toy from the metal enclosing container and consume it (with obviously dangerous consequences for the ingesting animal), as opposed to the rapid destruction that could ensue were a 2,000 pound Grizzly bear to remove a plastic treat toy designed for a toy poodle. In addition, since the metal treat toy could not be sliced, stretched or pulled as could a rubber treat toy, the metal treat toy is more likely to remain inside the enclosing container.

It is also contemplated that a high strength treat toy (or a high strength enclosing container), could be manufactured with the two halves meeting at an equator that is some shape other than a circumferential line. For example, a scalloped junction or a series of mating triangular rows, something akin to the jaws of a shark, would also function to keep the two halves together. A vertically divided sphere or irregular shape is also contemplated, where the two halves each contain part of the lip and the treat toy or enclosing container splits in half rather than having an obvious top and bottom portion.

Finally, means of connection other than relying solely on bolts and nuts are contemplated. For example, the sphere or other shape could be hinged at the bottom with one or more bolts and nuts to maintain the two halves in a closed position. Additionally, the use of cotter pins, locks, and even screws is contemplated as means of connecting one half to another. It is also foreseen that there could be only slots and flanges on the top portion, and that the bottom portion could have threads manufactured or drilled into the portions of the bottom portion which mate up against the holes in the flanges on the top portion, such that the bolts could be screwed right into the bottom portion.

What I claim is:
1. A food/treat-dispensing treat toy, comprising
a hollow container with an interior surface and an exterior surface, where the exterior surface has a diameter, where the hollow container is manufactured from materials which are non-toxic, where the hollow container consists of a single hole in its surface, where a lip defines the hole, where the hole has a diameter, where the lip is rounded and slightly thickened so as to prevent injury and irritation to the tongue, mouth, and lips of a pet; and an enclosing container having a cavity, where the enclosing container has an interior surface and an exterior surface, where the exterior surface has a diameter, where the enclosing container is manufactured from materials which are non-toxic, where the enclosing container consists of a single hole in its surface defined by a lip, where the hole has a diameter, where the lip of the enclosing container is rounded and slightly thickened so as to prevent injury and irritation to the tongue, mouth, and lips of a pet, where the diameter of the interior surface of the enclosing container is larger than the diameter of the exterior surface of the hollow container, where the hole in the enclosing container is large enough such that the hollow container is inserted completely through the hole and into the enclosing container and the hollow container is capable of containing a treat.

2. The treat toy of claim 1, where the diameter of the hole of the hollow container is approximately 55% of the diameter of the exterior surface of the hollow container.

3. The treat toy of claim 1, where the diameter of the hole of the hollow container is in the range of 40% to 70% of the diameter of the exterior surface of the hollow container.

4. The treat toy of claim 1, where the exterior surface of the enclosing container is manufactured from a material selected from the group consisting of felt, wool, and polyester.

5. The treat toy of claim 1, where the exterior surface of the hollow container is a sphere.

6. The treat toy of claim 5, where the diameter of the exterior surface of the hollow container is larger than 1.4 inches and smaller than 4.1 inches.

7. The treat toy of claim 1, where the treat toy has an external shape which is a shape other than a sphere.

8. The treat toy of claim 1, where the treat toy comprises a material selected from the group consisting of plastic, hard vinyl, nylon, synthetic polymers, synthetic fibers, polyamides, rubber and synthetic rubber.

9. The treat toy of claim 1, where the treat toy comprises a material selected from the group consisting of foam and a combination of foam and rubber.

10. The treat toy of claim 1, where the hole in the enclosing container is approximately 60% of the diameter of the exterior surface of the enclosing container.

11. The treat toy of claim 1, where the diameter of the hole in the enclosing container is in the range of 45% to 75% of the diameter of the exterior surface of the enclosing container.

12. The treat toy of claim 1, where the hollow container has a spherical shape, and the enclosing container has a spherical shape.

13. The treat toy of claim 1, where the diameter of the exterior surface of the enclosing container is less than 6.5 inches and the diameter of the exterior surface of the hollow container ranges between 50% and 80% of the diameter of the exterior surface of the enclosing container.

14. The treat toy of claim 1, where the lip of the enclosing container is rounded and slightly thickened.

15. The treat toy of claim 1, where the enclosing container comprises a material selected from the group consisting of plastic, hard vinyl, nylon, synthetic polymers, synthetic fibers, polyamides, rubber and synthetic rubber.

16. The treat toy of claim 1, where the enclosing container comprises a material selected from the group consisting of foam and a combination of foam and rubber.

* * * * *